Oct. 24, 1939.                D. H. McGOGY                    2,176,998
                               LIQUID METER
                          Filed Aug. 26, 1936            5 Sheets-Sheet 1

INVENTOR
Donald H. McGogy
BY T. J. Geisler
and L. R. Geisler
ATTORNEYS

Oct. 24, 1939.  D. H. McGOGY  2,176,998
LIQUID METER
Filed Aug. 26, 1936  5 Sheets-Sheet 2
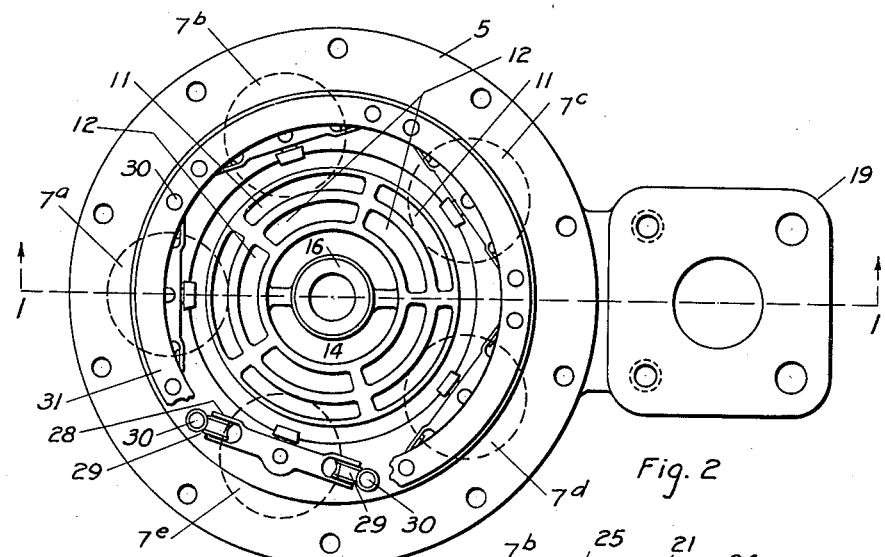
Fig. 2
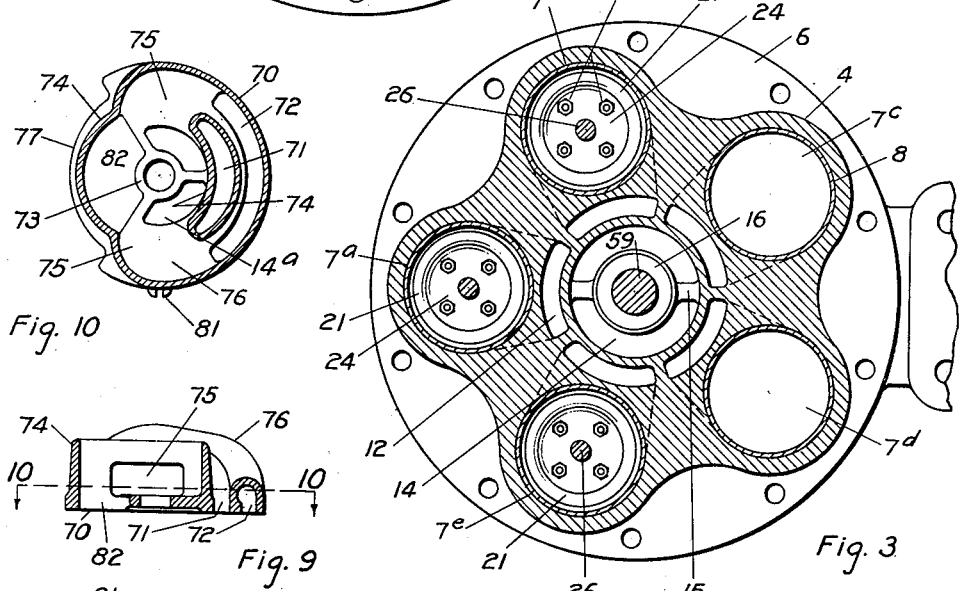
Fig. 10
Fig. 9
Fig. 3
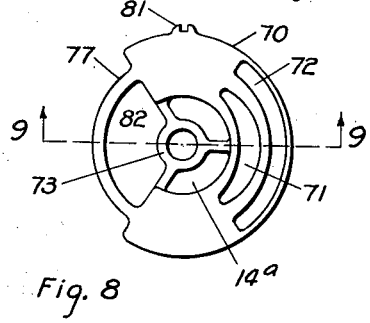
Fig. 8
INVENTOR
Donald H. McGogy
BY T. J. Geisler
and H. R. Geisler
ATTORNEYS Oct. 24, 1939.   D. H. McGOGY   2,176,998
LIQUID METER
Filed Aug. 26, 1936   5 Sheets-Sheet 3
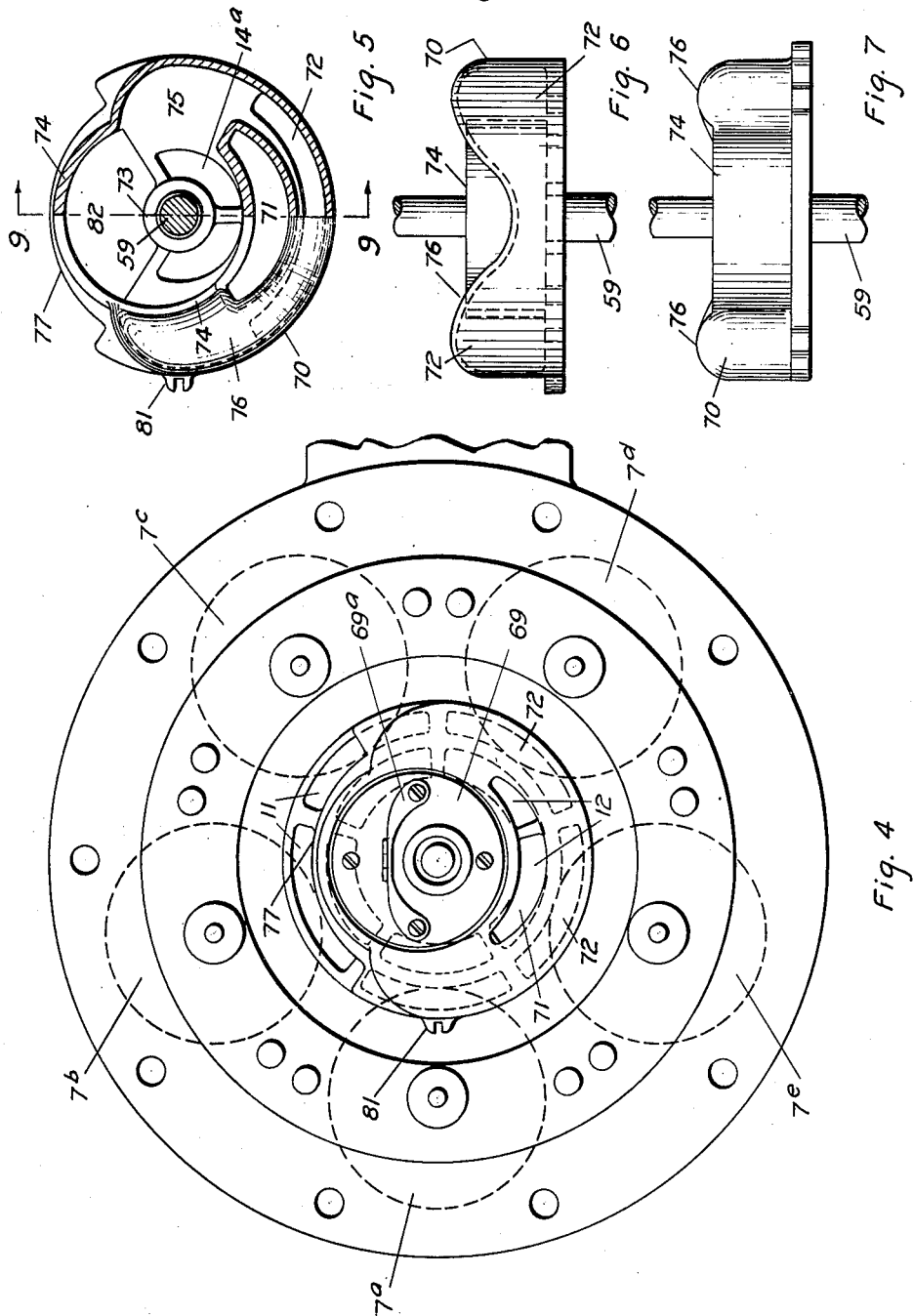
INVENTOR
Donald H. McGogy
BY T. J. Geisler
and R. R. Geisler
ATTORNEYS Oct. 24, 1939.　　　D. H. McGOGY　　　2,176,998
LIQUID METER
Filed Aug. 26, 1936　　　5 Sheets-Sheet 4

INVENTOR
Donald H. McGogy
BY T. J. Geisler
and L. R. Geisler
ATTORNEYS

Oct. 24, 1939. D. H. McGOGY 2,176,998
LIQUID METER
Filed Aug. 26, 1936 5 Sheets-Sheet 5

INVENTOR
Donald H. McGogy
BY T. J. Geisler
and L. R. Geisler
ATTORNEYS

Patented Oct. 24, 1939

2,176,998

UNITED STATES PATENT OFFICE 2,176,998

LIQUID METER

Donald H. McGogy, McMinnville, Oreg.

Application August 26, 1936, Serial No. 97,971

8 Claims. (Cl. 73—244)

My invention relates to meters for measuring liquids, especially to piston meters or positive displacement meters operated by the liquid which they measure. Such meters are provided with cylinders in which the liquid is measured, and with pistons which are reciprocated in the cylinders by the pressure of the liquid flowing into and out of the cylinders. The reciprocating motion of the pistons is translated thru mechanism into rotary motion, which operates a meter clock or other registering device.

One of the objects of my invention is to provide a meter in which the liquid enters and leaves the cylinders on both sides of the pistons, thus to utilize both sides of the pistons for measurement, with means of adjusting the length of the piston stroke after the meter has been set up, in order to correct any slight inaccuracy of manufacture, etc.; and with means for sealing such adjusting means in order to prevent any tampering with the meter after it has been brought into proper adjustment.

A difficulty often encountered with these liquid meters is that their accuracy is influenced by variation in the pressure of the liquids, or by variation in the speed at which the meter operates. Thus at low pressures, or speeds, the pistons may not complete their full stroke. Therefore, a further object of my invention is to provide a piston stroke compensator or regulator operating to insure the same length of stroke in my meter at low speeds, and pressures, as at high speeds and pressures.

A further object of my invention is to provide a meter which will operate efficiently and accurately under very low "head-loss" pressure.

A further object of my invention is to provide a single rotary valve,—which I shall designate a distributing valve—for controlling the opening of inlet and outlet ports of each cylinder of the meter in coordination with the piston travel.

A further object of my invention is to make proper provision and allowance for uniform acceleration and retardation of each piston stroke.

A still further object of my invention is to provide a rotary valve which will operate efficiently under any "head-loss" pressure, and with a minimum of friction of the valve on the valve seat, even under high "head-loss" pressure.

An additional object of my invention is to construct a meter so as to be adapted to operate when mounted in any position, either in the usual upright, vertical position, as illustrated, or inclined, if need be.

A still further object of my invention is to provide a meter in which the operating parts are protected against all unnecessary torque, strain, and wear, and furthermore a meter which is simple and sturdy in construction, long-lived, and requiring only minimum upkeep.

The above enumerated objects and incidental features I attain by constructing my meter and essential parts thereof in the manner to be described with reference to the accompanying drawings, in which:

Fig. 2 (Sheet 2) is a top plan view of my meter, with the cover, cam wheel, distributing valve and valve piston removed;

Fig. 3 (Sheet 2) is a horizontal section on line 3—3 of Fig. 1, but drawn on a smaller scale than Fig. 1, and on the same scale as Fig. 2;

Fig. 4 (Sheet 3) is a top plan view with cover, cam wheel, piston cross-heads, and supporting ring removed, and showing a top view of the distributing valve when in the position shown in Fig. 1 with both ports of the cylinder shown in Fig. 1 closed;

Fig. 5 (Sheet 3) is partly a top or plan view of the distributing valve, removed from the meter but mounted on the main shaft 59, and partly a horizontal section taken on line 10—10 of Fig. 9;

Fig. 6 (Sheet 3) is a front side elevation of the distributing valve corresponding to Fig. 5;

Fig. 7 (Sheet 3) is an elevation of the opposite side of the distributing valve;

Fig. 8 (Sheet 2) is a bottom plan view of the distributing valve, but drawn on a slightly smaller scale, and showing the valve as given a quarter turn on its axis from its position in Fig. 1;

Fig. 9 (Sheet 2) is a vertical section on the line 9—9 of Fig. 8;

Fig. 10 (Sheet 2) is a horizontal section on the line 10—10 of Fig. 9;

Fig. 14 (Sheet 1) is a fragmentary vertical section of the meter cover and adjusting ring showing the means by which the adjusting ring is held on the meter cover;

Figure 17:
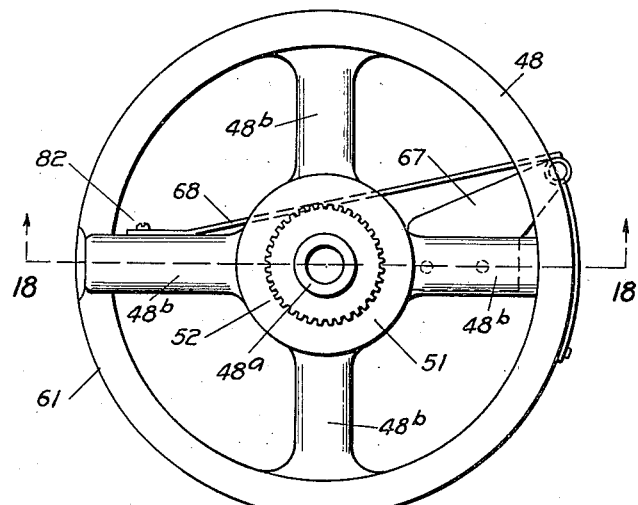
Fig. 17 (Sheet 5) is a top or plan view of the cam-wheel.
Figure 18:
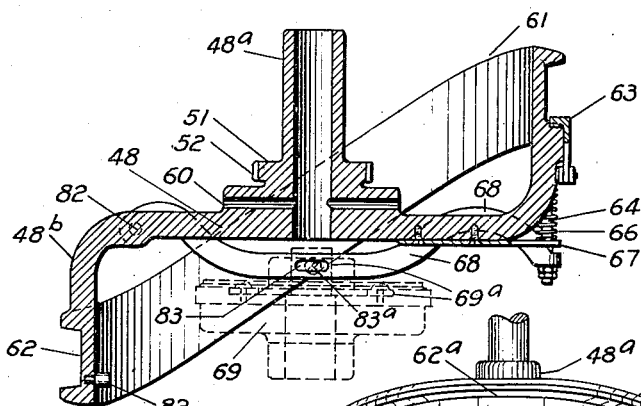
Figures 19, 20:
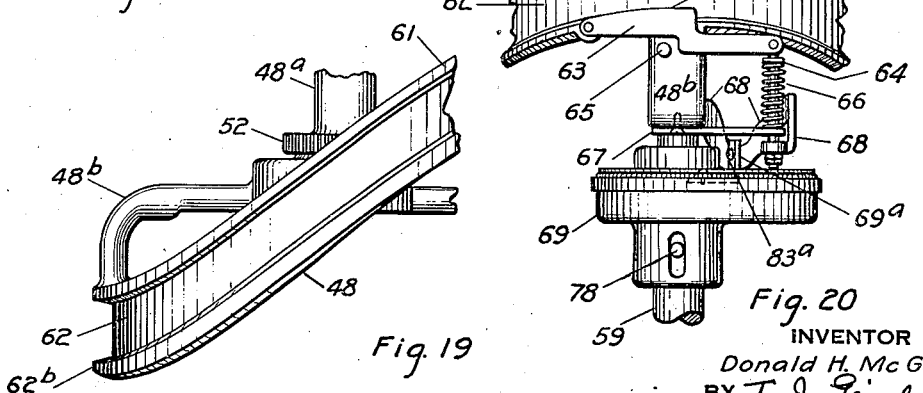

Fig. 18 (Sheet 5) is a vertical central section taken on the line 18—18 of Fig. 17 of the cam-wheel or actuating-member 48 of distributing valve 70, and in connection therewith showing in broken outline the "balancing piston" 69 and the operative connection therewith of the auxiliary cam element 63, the piston 59 being omitted;

Fig. 19 (Sheet 5) is a fragmentary side elevation of the cam-wheel shown in Fig. 17; and Fig. 20 (Sheet 5) is a further detail of the means for operating the auxiliary cam-element 63.

In my invention the meter is operated by the pressure of the liquid which is being metered. Fluid pressure is exerted on the alternate sides of the pistons 21 thru a properly timed valve, which controls the flow of the liquid thru inlet and outlet ports, thus causing the pistons to reciprocate and by this motion transmit rotary movement to the cam-wheel or actuating element connected to means which operate the usual registering or recording device.

Figure 1:
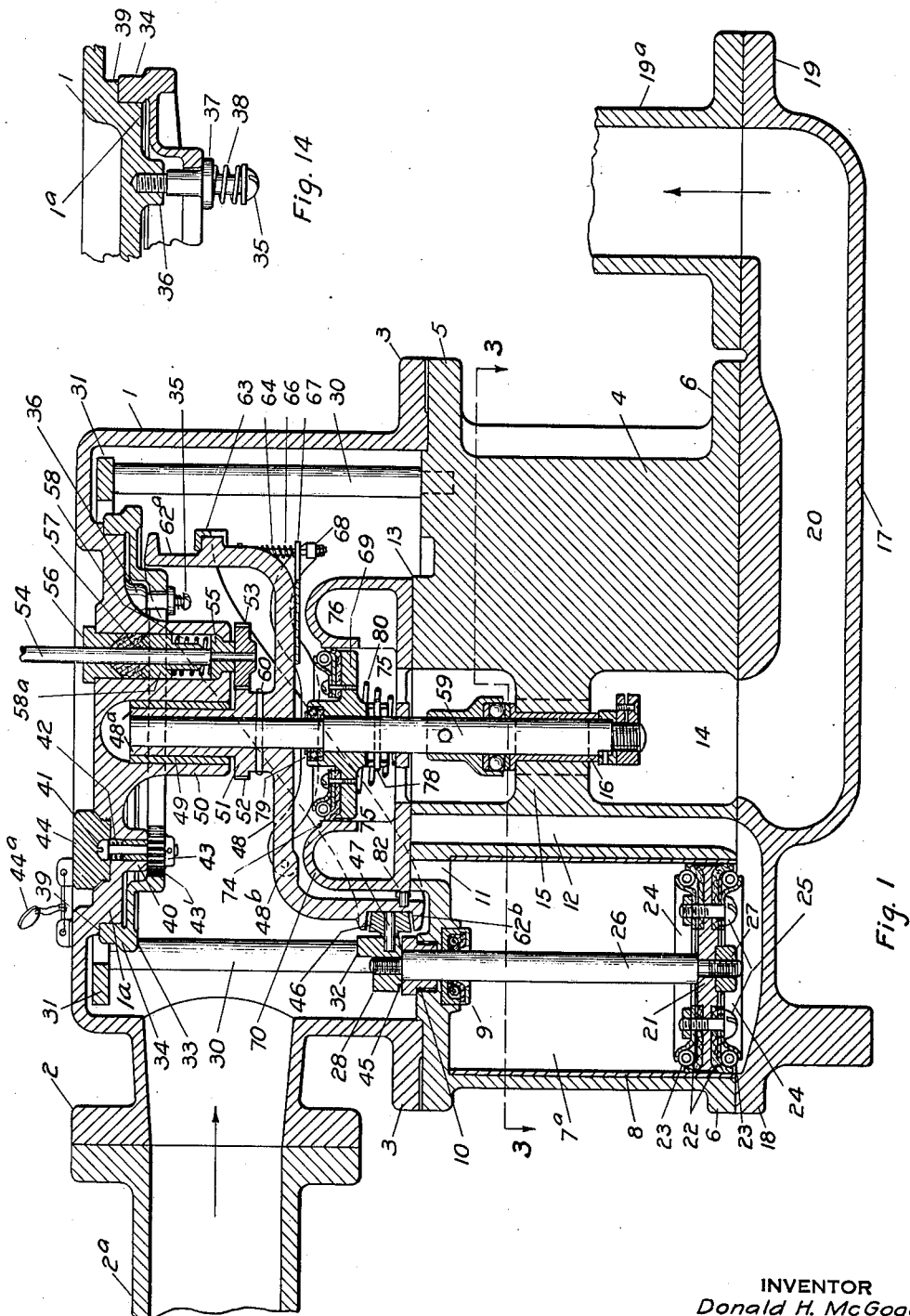
Fig. 1 (Sheet 1) is a vertical, medial section of my fluid meter taken on line 1—1 of Fig. 2 (Sheet 2) but drawn to a larger scale than Fig. 2.

The housing of the meter is arranged preferably in three parts 1, 4, 17, see Fig. 1, which parts are fastened together by usual means, not shown, with gaskets of suitable material interposed between the machined contact surfaces of the parts, as customary, to assure leak-proof joints. The cover 1 is a casting provided with a hollow flanged projection 2 to which a fluid intake pipe 2a may be affixed; and has a peripheral flange 3 about its main body, furnished with a series of holes in which bolts, cap screws or studs may be placed.

The second part 4 of the housing, which I designate as the cylinder block, is also a casting with two peripheral flanges 5 and 6, similar to the flange 3 of cover 1. The cylinder block 4 is provided with a plurality of parallel liquid measuring cylinders 7a, 7b, 7c, etc., preferably five in number (as shown in Figs. 2 and 3) spaced equi-distant on the circumference of a circle. The cylinders may have removable liners 8 pressed tightly in them, as illustrated in Figs. 1 and 3. At the top of each cylinder a packing gland 9, and a stop bushing 10 are securely fastened. A passage 11 and a conduit 12 for each cylinder are formed in the cylinder block 4 and lead from the machined valve surface 13 at the top of cylinder block 4 to the upper and lower ends, respectively, of each cylinder, serving alternately as intake and discharge passages for the fluid, and thus enabling the fluid to enter and leave each cylinder on both sides of the piston 21.

The cylinder block 4 has a comparatively large, centrally disposed conduit 14 extending completely thru it, obstructed only by a spider 15 (see Figs. 1 and 3) which is bored to receive a main shaft bearing 16.

The third part of the housing is the base 17, which is a casting having a peripheral flange 18 companion to the flange 6 of the cylinder block 4, and a hollow, flanged projection 19 to which a fluid discharge pipe 19a may be affixed. Holes in the flange 18 coincide with holes in the flange 6, and suitable bolts, cap screws, studs or the like may be used for clamping securely together these two parts of the housing and their interposed gasket to form a leak-proof joint.

The base 17 is formed so as to have a space below each measuring cylinder 7a, 7b, etc., for the passage of the liquid from the conduit 12 into the lower end of each cylinder. A large conduit 20 leads from the central conduit 14 to a discharge pipe 19a fastened to the flange 19.

In each of the measuring cylinders 7a, 7b, 7c, 7d and 7e is located a piston 21, as illustrated in Fig. 1. The piston 21 is preferably provided with a leather seal-washer 22 on each face. These seal-washers 22 are held in constant leak-proof contact with the cylinder wall by annular coiled springs 23, which in turn are firmly held in position by metal retainers 24. These retainers 24 are clamped together by a plurality of screws 25.

The piston rod 26 has its lower end threaded and of reduced diameter, and passes thru the piston 21, being affixed thereto by a nut 27. The upper end of the piston rod 26 passes thru the packing gland 9, which may consist of a leather seal-washer, annular coiled spring, and retainers affixed in the cylinder block similar to like parts above described. This packing gland seals the cylinder and prevents leakage around the piston rod due to the downward pressure of the fluid in the cover section 1 of the meter. The piston rod 26 extends thru the bushing 10 and on its upper end a cross-head 28 (shown in Figs. 1, 2, 15 and 16) is secured. The cross-head 28 has forked ends in which rollers 29 are journaled. These rollers are so shaped and mounted as to roll freely in a vertical plane on the guide posts 30, see Figs. 1 and 2; which guide posts are threaded at their bases into the cylinder block 4 and affixed at their upper ends to a ring 31. The guide posts, two for each cylinder, are disposed in the circumference of a circle, and are held in the correct relation to each other by the ring 31. The cross-heads 28 and guide posts 30 hold the piston rods 26 in axial alinement with their respective cylinders, and permit only up and down movement of the piston rods. Even if the meter is so mounted that the piston rods are not vertical the guide posts 30 and cross-heads 28 hold the piston rods in proper axial alinement.

Figure 11:
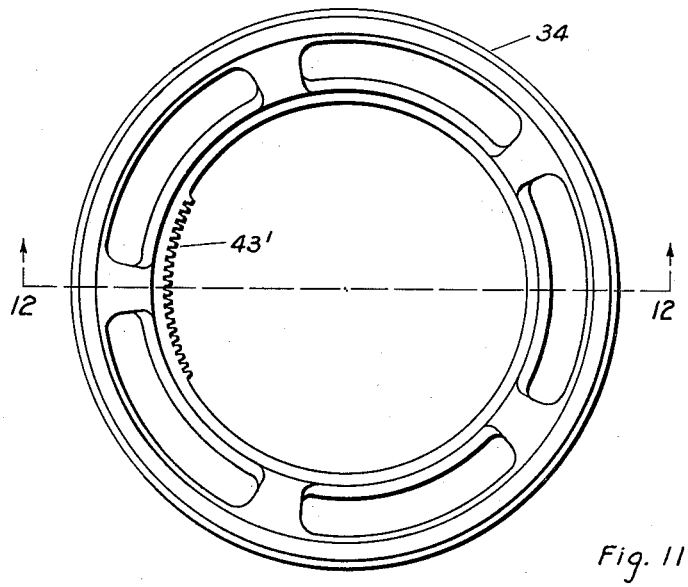
Fig. 11 (Sheet 4) is a top plan view of the adjusting ring, which ring limits the extent of piston travel, as hereinafter described.
Figure 12:
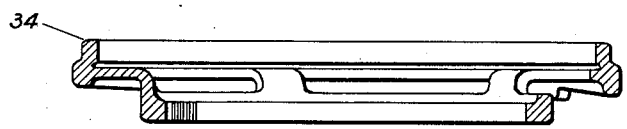
Fig. 12 (Sheet 4) is a vertical, medial section on the line 12—12 of Fig. 11.

An adjusting ring 34 is rotatably mounted on an internal projection 1a formed in the cover 1 (see Fig. 1), and is supported by a plurality of screws 35, one of which is shown in detail in Fig. 14, threaded into suitable bosses 36 of the cover 1, and carrying sliding collars 37 and coiled springs 38. The collars 37 and the tension of the springs 38 against the collars hold the adjusting ring 34 against the shoulder 39 in the cover. In the projecting boss 40 of the cover 1 a small bearing is tightly fitted, and in this is journaled a stub shaft 41 (see Fig. 1), with a screw head formed on its upper extremity and a pinion 43 rigidly fastened on its lower end. A coil spring 42 normally holds the stub shaft 41 and pinion 43 against turning. The teeth of the pinion 43 mesh with a plurality of teeth 43' on the inner circumference of adjusting ring 34 (see Figs. 1 and 11). Turning the screw head of the shaft 41 by a screw driver, or other suitable means, causes the pinion 43, meshing with the gear teeth 43' of the adjusting ring 34, to move said adjusting ring in an arc about its center. The tension of the springs 38 is sufficient to counteract any tendency of the ring 34 to rotate. A seal plug 44 (Fig. 1) covers the screw head of stub shaft 41.

Figure 13:
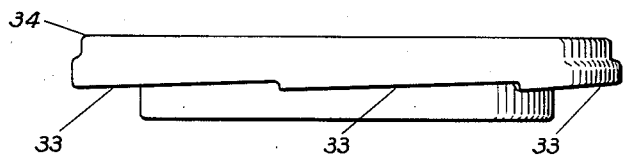
Fig. 13 (Sheet 4) is a side elevation of the adjusting ring shown in Fig. 11.
Figure 15:
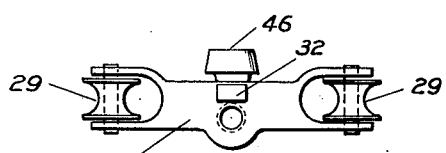
Fig. 15 (Sheet 4) is a top or plan view of the piston rod cross-head.
Figure 16:
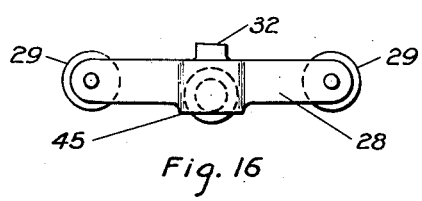
Fig. 16 (Sheet 4) is a side elevation of this cross-head.

A plurality of stroke limiting cam segments 33 with inclined faces, one for each cylinder, are formed on the under side of the adjusting ring 34, as illustrated in Fig. 13. Each cross-head 28 has a raised lug 32 on its upper surface (see Figs. 15 and 16) which is adapted to come into contact with a segment 33 of the adjusting ring 34. The upward motion of the cross-heads 28, and of the pistons 21, is thus definitely limited by the lugs 32 of the cross-heads 28 contacting said segments 33; and it will be apparent that the points at which the lugs 32 contact said segments 33 may be changed by removing the seal plug 44 and rotating the adjusting ring 34 slightly by the turning of the screw 41, and thus adjust the upstroke of all the pistons uniformly. Arresting of downward movement of the pistons occurs when the bosses 45 (shown in Fig. 16) on the lower surface of the cross-heads 28 contact the stop bushings 10. Thus piston stops are provided at each end of the piston stroke restricting the piston to the proper length stroke; and furthermore the length of the stroke may be adjusted to correct any slight inaccuracy of the meter.

The seal plug 44 is placed over the top of screw 41 so that when the adjusting ring 34 has been adjusted and the plug 44 put in place, no tampering with the adjusting ring 34 can take place unless the seal 44a is broken and the seal plug 44 removed.

The accuracy of displacement fluid meters depends entirely upon the capacity of the measuring cylinders and consequently on the consistently equal length of stroke of the pistons in the measuring cylinders, and therefore, by confining the travel of the pistons within definite limits by proper adjustments and stops in the manner described, a high degree of precision is obtained and maintained regardless of the wear of the moving parts of the meter.

The reciprocating motion of the pistons is translated into rotary motion of the cam wheel 48 by means of beveled rollers 46 rotatably mounted on pins 47 (see Figs. 1 and 15) secured in the side of the cross-heads 28, and traversing the spiral-like cam groove 62 in the cam wheel 48. The cam wheel 48 is provided with an elongated hub 48a journaled in the bearing 49, provided in the pendent projection 50 of the cover section 1. The hub 48a has an annular flange 51 the outer periphery of which is provided with gear teeth 52 (see Figs. 1, 18 and 19). The gear teeth 52 mesh with a pinion 53 affixed on the shaft 54 of a conventional registering or recording device (not shown). The shaft 54 is rotatably mounted in bearings 55 and 56 firmly supported in the cover section 1. Leakage of fluid thru the bearings 55 and 56 is prevented by the soft packing 57 against which gland 58a is pressed by a coiled spring 58. The hub 48a of the cam wheel 48 is bored to receive the main shaft 59, and is securely affixed thereto by a taper pin 60 (Fig. 1).

A plurality of arms or spokes 48b, preferably four, extend radially from the hub 48a to the rim 61 of the cam-wheel (see Figs. 17, 18 and 19). The rim 61 is of spiral annular form, semi-helical in inclination and declination, and symmetrical with respect to the axes of the four arms or spokes, having a continuous spiral cam-groove 62 about its periphery. The cam-groove 62 is widened at its highest point to permit the adjustment of the length of the piston strokes provided by the adjustment ring 34 in the manner already described.

Reciprocation of the piston rods 26 carrying the cross-heads 28 and the rollers 46, which traverse the groove 62, causes the cam wheel 48 to rotate. The groove 62 on the rim 61 of cam wheel 48 has its curve flattened at the highest point 62a and at the lowest point 62b, its inclination and declination being designed so as to provide for uniform acceleration and deceleration of the piston travel near each end of the piston stroke, thus preventing any abrupt change of motion of pistons and piston rods, while permitting the cam wheel 48 to be rotated with uniform speed.

The valve 70 is of special design, being a casting having a smooth sliding surface contact with the machined surface 13 of the cylinder block 4, and having an inlet port 71 and outlet port 72 formed in its structure. See Figs. 5 to 10. The valve body includes a spider 73 with concentric hub which is bored to slide easily on the main shaft 59. Eccentric with said spider 73 and its hub a vertical cylindrical wall 74 is formed in the valve body. The said cylindrical wall 74 is provided with opposed openings or ports 75 (see Figs. 5 and 9). The outlet port 72 in the base of the valve 70 is connected by arched passageways 76 to the ports 75 (see Figs. 1, 6, 7, 9 and 10). The passageways 76 are preferably so arched as to offer the least resistance to passage of liquid from outlet port 72 to ports 75. From the ports 75 the liquid passes thru port 14a of the valve 70 into the main central conduit 14 (see Figs. 5 and 1), and thence to the discharge passageway 20 in the base of my meter. The periphery of valve 70 is cut away at 77, as shown in Figs. 4, 5, 8 and 10, to provide an inlet port, diametrically opposite the inlet port 71. A segment 82 is cut out of the bottom of the valve 70 between the wall 74 and the hub of the spider 73, adjacent the cut out portion 77 of the periphery, as shown in Figs. 5, 8 and 10. This cut out segment 82 constitutes an outlet port and is diametrically opposite the outlet port 72. Within the cylindrical wall 74 is a piston 69, as shown in Figs. 1, 4 and 20. Thus 72 and 82 act as outlet ports for the passages 11 and conduits 12, respectively, of the cylinders 7a, 7b, etc., the outlet ports always exhausting beneath the valve piston 69, and 77 and 71 act as inlet ports for the passages 11 and conduits 12, respectively of the cylinders.

The piston 69 consists of a body, a suitable seal washer, coiled spring and retainer, or other means to assure a leakproof fit between the piston 69 and the wall 74. The hub of the piston 69 is bored to slide easily on the shaft 59 (see Fig. 1), and is provided with vertical slots in its lower face, in which bears the pin 78 in the shaft 59, thus allowing the piston 69 up and down movement with respect to and on the shaft 59.

A packing gland 79 is recessed in the opposite and upper end of the hub of the piston 69. A spiral compression spring 80 bears against the lower face of the piston 69 and also against the spider 73 of the valve 70, and tends to keep the latter seated on seat surface 13 of cylinder block 4. The piston 69 seals the upper end of the chamber formed by the cylindrical wall 74 of the valve 70. The other purposes of the piston 69 will be explained later.

The periphery of the valve 70 is provided with a slotted projection 81 (see Figs. 4, 5, 8 and 10) adapted to be engaged by a pin 82 (Figs. 1 and 18) which causes the valve 70 to be rotated with cam wheel 48.

The operation of the distributing valve 70 and cam wheel or actuating element 48 in conjunction with the reciprocation of the piston rods 26 of the pistons 21 may now be described. The liquid entering the meter thru the flanged opening 2, as indicated by the arrow in Fig. 1, fills the cover section 1. Assuming the position of the distributing valve 70 to be as shown in Figs. 1, 4 and 5, the web of the valve 70 covers the passage 11 and conduit 12 of cylinder 7a, but at the same time the inlet port 71 of the distributing valve 70 will be over conduits 12 of measuring cylinders 7d and 7e, permitting liquid under pressure to enter the lower end of these cylinders and force their respective pistons 21 upward. At the same time the outlet port 72 of distributing valve 70 will be over the passage 11 of these same cylinders 7d and 7e, permitting the fluid above their respective pistons to be forced out thru the inclosed passageways 76, and into the discharge passage 20 of the base. Further, at the same time, and while the valve 70 still is in the same position, liquid is permitted to enter the passages 11 of the cylinders 7b and 7c, due to the fact that the cut away portion 71 (see Fig. 4) is above these conduits in the cylinders 7b and 7c. Thus, liquid is admitted into the cylinders 7b and 7c above their respective pistons, forcing the pistons downward. At the same time the liquid below the pistons in these cylinders 7b and 7c is permitted to be forced out thru the respective conduits 12 thru the segmental opening 82 in the bottom of valve 70, and thence escapes down thru conduit 14 and discharge passage 20.

During this position of the valve 70, the passage 11 and conduit 12 of cylinder 7a are both completely closed, as mentioned, and consequently there is momentarily no movement of the fluid in or out of cylinder 7a; and thus the piston 21 and piston rod 26 within measuring cylinder 7a are momentarily at rest. Consequently, while the distributing valve 70 is in the position illustrated in Figs. 1 and 4, the pistons of measuring cylinders 7b and 7c are moving downward and the pistons of measuring cylinders 7d and 7e are moving upward; each piston, however, being at a different position of its stroke. The movement of these pistons causes the cam wheel 48 to be rotated, and the rotation of the cam wheel 48 in turn causes the distributing valve 70 to be rotated and function as described.

The cam-groove 62 on the periphery of cam-wheel 48 is flattened for a substantial distance, that is for approximately 15° at the highest and lowest points, as indicated at 62a in Fig. 20, and at 62b in Fig. 19; so as to provide a straight course on each side of the highest and lowest point reached by the cam rollers 46 on the upstroke and downstroke of the pistons 21, thus permitting the pistons to reach the ends of their strokes under pressure of the liquid for a substantial interval ahead of the closing of the valve ports. The lower rim of the cam-groove 62 at section 62a is recessed and in this recess is mounted a piston stroke compensating lever-arm 63 having a cam-edge 84. The free end of this lever-arm 63 is pivoted to the top of a shouldered, vertical pin 64, which bears in a hole provided in a bracket-arm 67, fastened to one of the spokes 48b of the actuating element 48; and pin 64 is rigidly supported in the outer end of an arcuate lever arm 68, which is pivoted to spoke 48b of the actuating element 48 at 82, as shown in Figs. 17 and 18. A compression spring 66 is placed on the pin 64 above the bracket 67. The lower arcuate lever arm 68 is provided with a slot 83 in which bears a pin 83a provided on a bracket 69a of the floating balancing piston 69, see Fig. 20. A stop pin 65, Fig. 20, limits the depression of lever arm 63.

The cam-edge 84 of the piston stroke compensating lever 63, when this lever is in its raised position, as shown in Fig. 20, provides a supplemental cam-surface for the cam rollers 46 to ride over in the cam-groove 62 of actuating element 48, and thus assures a full or complete upstroke of the pistons 21, if low "head loss" pressure would leave such stroke uncompleted. The operation is as follows: The depression of the valve balancing piston 69 in response to normal head-pressure, pulls the piston stroke compensating lever 63 down and compresses spring 66, withdrawing the cam-edge 84 from the cam groove 62. But, when the "head loss" pressure is very low, the pressure on piston 69 is insufficient to compress the spring 66, and, as a result, the compensating lever 63 is raised and the cam edge 84 of the latter is projected into the cam groove 62, as illustrated by Fig. 20. The cam rollers 46 of the actuating element will then ride over said cam edge 84 and the upstroke of the pistons 21 will be extended until they contact their stopping cam-surface 33 on the adjusting ring 34.

The amount of pressure "head loss" varies with the speed of the meter. It is greater at high speeds of the meter than at low speeds. Thus, regardless of the fluctuations of the pressure head-loss, the accurate measuring operation of the pistons 21 in the measuring cylinders 7a, 7b, etc., is nevertheless assured in my device, and the operation is consistently efficient for all operating velocities.

A fault found with many liquid meters in present use is that inaccurate measurements develop as pressure "head-loss" is changed by change in velocity of liquid being measured.

The described construction of pressure compensating lever 63 also prevents undue wear of the cam edge, which would occur if this cam edge were constantly contacted by the cam rollers 46.

The valve balancing piston 69, besides functioning as described, further performs an even more important function; namely, relieving the pressure on distributing valve 70. Ordinarily the "head-loss" or pressure of the liquid on the top of distributing valve 70 would cause considerable friction in the rotation of this valve on its seat surface 13 of cylinder block 4, and thus impair the efficiency of the meter. But the valve 70 is relieved of such pressure by connecting the floating piston 69 with the shaft 59, as illustrated by Figs. 1 and 20 and above described. I consider this one of the important features of my liquid meter. Should, due to some unforeseen cause, there be any sudden back pressure up against the bottom of distribution valve 70, this valve would be permitted by spring 80 and piston 69 to rise slightly from its valve seat 13, thus instantly relieving such back pressure and acting as a safety valve, so to speak.

While I have described the construction of my meter as comprising five cylinders, of which one only has been shown in Fig. 1 in order to keep the drawings as simple as possible, it is apparent that a greater number of cylinders might be employed. However, I have found the use of five cylinders to be most practical and the doubling of the capacity of the meter by means of the double acting pistons makes my meter, as illustrated herein, adequate for any general use. It is, of course, not my intention to limit my invention to the exact construction shown, for various modifications might be made without departing from the principles of my invention.

I claim:

1. In a liquid measuring meter having an inlet and an outlet, a plurality of cylinders, pistons reciprocating in said cylinders, ports in the opposite ends of said cylinders, a rotatable distributing valve adapted to connect the ports of said cylinders with the inlet and outlet for the liquid in the meter, a balancing piston in said valve, an actuating element operating said distributing valve, said actuating element provided with a peripheral, helical, reversing, endless cam-groove, said pistons including rods provided with cam-rollers bearing in said cam-groove, the reciprocation of said pistons rotating said actuating element and distributing valve, and a manually rotatable plate provided with a series of cam-like surfaces opposed to said piston rods, respectively, whereby to limit the strokes of the pistons and thus adjust uniformly the displacement of said pistons in said measuring cylinders.

2. In a liquid measuring meter having an inlet and an outlet, a plurality of cylinders, pistons reciprocating in said cylinders, ports in the opposite ends of said cylinders, a rotatable distributing valve adapted to connect the ports of said cylinders with the inlet and outlet for the liquid in the meter, a balancing piston in said valve, an actuating element operating said distributing valve, said actuating element provided with a peripheral, helical, reversing, endless cam-groove, said pistons including rods provided with cam-rollers bearing in said cam-groove, the reciprocation of said pistons rotating said actuating element and distributing vlave, piston-stroke compensating means comprising a lever pivotally supported by said actuating element and provided with an auxiliary cam-edge projected into said cam-groove in one position of this lever, and means actuated by the movement of said balancing piston controlling the position of this lever, and adapted to withdraw said cam-edge from said cam-groove under normal liquid pressure and project said cam-edge into said cam-groove under low liquid pressure, and thus assure a full stroke of the pistons notwithstanding low liquid pressure.

3. In a liquid measuring meter having an inlet and an outlet, a plurality of cylinders, pistons reciprocating in said cylinders, ports in the opposite ends of said cylinders, a rotatable distributing valve adapted to connect the ports of said cylinders with the inlet and outlet for the liquid in the meter, a balancing piston in said valve, an actuating element operating said distributing valve, said actuating element provided with a peripheral, helical, reversing, endless cam-groove, said pistons including rods provided with cam-rollers bearing in said cam-groove, the reciprocating of said pistons rotating said actuating element and distributing valve, said cam-groove having a straight course for a substantial distance at its highest and lowest points, and an auxiliary cam-element located in the upper of said straight courses of said cam-groove and operatively connected with said balancing piston, whereby, upon low pressure, said auxiliary cam-element is projected into said cam-groove and full up-strokes of the pistons are assured.

4. A liquid measuring meter comprising a housing having a liquid inlet, a plurality of measuring cylinders provided with passages admitting liquid into their opposite ends, pistons reciprocating in said cylinders, a liquid outlet, a vertical shaft within said housing, an annular distributing valve mounted on said shaft, said valve including a central annular spring-seated valve-bearing piston means for transferring undue head pressure on this valve piston to said shaft, said valve having ports adapted to connect said passages of the cylinders alternately with the interior of the housing and with the said outlet and thus cause said pistons to be reciprocated, an actuating element mounted on said shaft and operating said distributing valve, said actuating element provided with a peripheral, helical, reversing, endless cam-groove, said pistons including rods provided with cam-rollers bearing in said cam-groove, whereby the reciprocating of said pistons rotates said actuating element and distributing valve, a spindle driven by said actuating element and adapted to be connected to a registering instrument, and manual means for limiting uniformly the strokes of all pistons and thus adjusting the displacements of said pistons.

5. A liquid measuring meter comprising a housing having a liquid inlet, a plurality of measuring cylinders provided with passages admitting liquid into their opposite ends, pistons reciprocating in said cylinders, a liquid outlet, a vertical shaft within said housing, an annular distributing valve mounted on said shaft, said valve including a central annular spring-seated valve-balancing piston means for transferring undue head pressure on this valve piston to said shaft, said valve having ports adapted to connect said passages of the cylinders alternately with the interior of the housing and with said outlet and thus cause said pistons to be reciprocated, an actuating element mounted on said shaft and operating said distributing valve, said actuating element provided with a peripheral, helical, reversing, endless cam-groove, said pistons including rods provided with cam-rollers bearing in said cam-groove, whereby the reciprocating of said pistons rotates said actuating element and distributing valve, a spindle driven by said actuating element and adapted to be connected to a registering instrument, and an auxiliary cam-element located at the upper portion of said cam-groove and operatively connected with said valve-balancing piston, whereby, upon low pressure, said auxiliary cam-element is projected into said cam-groove and full up-stroke of the pistons is assured.

6. In a liquid measuring meter, a housing having a liquid inlet, a plurality of measuring cylinders provided with passages admitting liquid into their opposite ends, pistons reciprocating in said cylinders, a liquid outlet, a rotatable distributing valve having ports adapted to connect said passages of the cylinders automatically with the interior of the housing and said outlet and thus cause said pistons to be reciprocated, an actuating element operating said distributing valve, said actuating element provided with a peripheral, helical, reversing, endless cam-groove, said pistons including rods provided with cam-rollers bearing in said cam-groove, whereby the reciprocation of said pistons rotates said actuating element and distributing valve, manually operated means for limiting simultaneously and uniformly the strokes of all pistons and thus adjusting the displacements of said pistons, and a spindle driven by said actuating element adapted to be connected to a registering instrument.

7. In a liquid measuring meter, a housing having a liquid inlet, a plurality of measuring cylinders provided with passages admitting liquid into their opposite ends, pistons reciprocating in said cylinders, a liquid outlet, a rotatable distributing valve having ports adapted to connect said passages of the cylinders alternately with the interior of the housing and said outlet and thus cause said pistons to be reciprocated, a valve-balancing piston in said valve, an actuating element operating said distributing valve, said actuating element provided with a peripheral, helical, reversing, endless cam-groove, said pistons including rods provided with cam-rollers bearing in said cam-groove, whereby the reciprocation of said pistons rotates said actuating element and distributing valve, said cam-groove having a straight course for a substantial distance at its highest and lowest points, an auxiliary cam-element located in the upper of said straight courses of said cam-groove and operatively connected with said valve-balancing piston, whereby, upon low pressure, said auxiliary cam-element is projected into said cam-groove and full up-stroke of the pistons is assured, and a spindle driven by said actuating element adapted to be connected to a registering instrument.

8. In a meter of the character described including a plurality of cylinders with pistons and piston rods reciprocating in said cylinders, a rotatable distributing valve, a balancing piston in said valve, an actuating element operating said valve, said actuating element having an endless cam groove, members associated with said piston rods cooperating with said cam groove to cause the rotation of said element when said piston rods are reciprocated, a lever connected with said actuating element and provided with an auxiliary cam edge adapted to be projected into said cam groove in one position of said lever, means actuated by the movement of said balancing piston for controlling the position of said lever, whereby said cam edge will be withdrawn from said cam groove under normal pressure on said balancing piston but will be projected into said cam groove under low pressure on said balancing piston.

DONALD H. McGOGY.